United States Patent Office 3,385,880
Patented May 28, 1968

3,385,880
PROCESS FOR THE PREPARATION OF ALKYL MONONITRILES
Richard L. Abbott, Terre Haute, Ind., assignor to Commercial Solvents Corporation, New York, N.Y., a corporation of Maryland
No Drawing. Filed June 16, 1965, Ser. No. 464,577
7 Claims. (Cl. 260—465.1)

ABSTRACT OF THE DISCLOSURE

A process for preparing alkyl mononitriles by passing a gaseous stream of a primary or secondary nitroalkyl reactant into contact with platinum under vapor phase reaction conditions. Exemplary of primary nitroalkyl reactants is 1-nitropropane. Exemplary of secondary nitroalkyl reactants is 2-nitropropane.

---

This invention generally relates to a process for the production of alkyl nitriles. In a particular aspect the invention relates to a process for the production of alkyl nitriles by contacting a gaseous nitrohydrocarbon selected from the group consisting of primary nitrohydrocarbons and secondary nitrohydrocarbons with platinum.

Methods are known for the production of alkyl nitriles. One known method involves the reaction of an alkyl halide with sodium or potassium cyanide in an aqueous-alcoholic reaction media. Another known method involves the reaction of an alkyl sulfonate with potassium ferricyanide.

It is an object of the present invention to provide a novel process for the production of alkyl nitriles.

Further objects and advantages of the present invention will be apparent from the specification and the appended claims.

The present invention resides in the discovery that alkyl nitriles are produced by passing a gaseous stream of a nitrohydrocarbon selected from the group consisting of primary nitrohydrocarbons and secondary nitrohydrocarbons into contact with platinum as a catalyst.

The nitrohydrocarbon used in the process should be a primary nitrohydrocarbon or a secondary nitrohydrocarbon. A primary nitrohydrocarbon is a nitrohydrocarbon wherein the nitro group is bonded to a carbon atom which in turn is bonded to at least 2 hydrogen atoms. A secondary nitrohydrocarbon is a nitrohydrocarbon wherein the nitro group is bonded to a carbon atom which is in turn bonded to 2 and not more than 2 carbon atoms. Suitable nitrohydrocarbons are those which are readily vaporized at temperatures below which substantial decomposition of the particular nitrohydrocarbon occurs. Typically suitable nitrocarbons are represented by the formula

wherein R is a lower alkyl radical, that is an alkyl radical containing from 1 up to about 7 carbon atoms and R¹ is hydrogen or a lower alkyl radical. Representative nitrohydrocarbons which may be employed include 1-nitropentane, 1-nitropropane, nitroethane, 1-nitrohexane, 1-nitroheptane, 1-nitrooctane, 1-nitrobutane, 2-nitropropane, 2-nitrobutane, 3-nitrohexane, etc., and the like. As noted above, the nitrocarbons are primary or secondary mononitroalkyl reactants and the products are alkyl mononitriles. Alkyl nitriles produced from such typical nitrohydrocarbons are represented by the formula

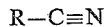

wherein R is defined as before. Representative alkyl nitriles include acetonitrile, propionitrile, valeronitrile, capronitrile, butyronitrile, etc., and the like.

The platinum catalyst of use in the present invention may be of any suitable form. The catalyst may be in the form of pellets, in the form of fine powder or other shaped pieces of suitable size of regular or irregular contour. The catalyst may be used with or without a suitable catalyst support. Suitable supports for the catalyst include alumina, silica gel and silicon carbide.

Since the nitrohydrocarbon utilized in the present invention must be in the vapor phase when brought into contact with the platinum catalyst the temperatures that are employed in the process must be sufficient to maintain the nitrohydrocarbon in the vapor phase but should not exceed temperatures at which substantial decomposition of the alkyl nitrile reaction products occur. Such temperatures depend principally on the particular nitrohydrocarbon utilized and on the particular alkyl nitrile produced in the process. In general, temperatures of above 800° C. should be avoided.

In order to more easily maintain the nitrohydrocarbon feed stock at a uniform temperature during the reaction, especially when temperatures above about 300° C. are utilized, it is preferable to mix an inert diluent gas with the nitrohydrocarbon feed stock. Suitable gases include nitrogen, steam, methane, carbon dioxide, etc., and the like.

The present process is conveniently practiced at atmospheric pressures although if desired sub-atmospheric or super-atmospheric pressures may be used. A generally suitable pressure range is from about 10 to about 1000 pounds per square inch absolute.

The process is most economically carried out in a continuous manner although batchwise operation may be used. For continuous operation the nitrohydrocarbon feed is brought into the vapor phase in a suitable vaporizer and if desired mixed at that time with inert diluent gas. The reaction is then effected by passing the gaseous nitrohydrocarbon through a heated reaction zone containing the platinum catalyst. The reaction zone advantageously is defined by an elongated tube or tubes wherein the platinum catalyst is positioned. A separate vaporizing means may be employed or the forepart of the heated reaction zone may serve as vaporizer for the nitrohydrocarbon.

When the process is conducted in a continuous manner the flow rate of the nitrohydrocarbon is so adjusted that the desired conversion of nitrohydrocarbon to alkyl nitrile is obtained in the desired period of time. The term "flow rate" as used in the present specification and appended claims refers to the total number of grams of nitrohydrocarbon contacted with 1 cc. of catalyst per hour, the volume of catalyst being measured in bulk. The optimum flow rate to be employed in any particular case depends among other things on the particular nitrohydrocarbon used as well as on the specific conditions of reaction such as temperature and pressure. Typically suitable flow rates generally are within the range from about 0.1 to about 100.

The alkyl nitriles obtained by the present invention may be recovered by any suitable procedure. Typically the reaction product is passed from the reaction zone and is then cooled to liquefy the product. The liquefied product is then distilled to recover the alkyl nitrile product.

The invention will be understood more fully by reference to the following specific examples. It is understood that the examples are presented for purposes of illustration only and are not intended as a limitation of invention.

In the following examples the process was carried out by passing gaseous nitrohydrocarbon downward through a glass tube 18" long and ½" in diameter, the lower portion of which contained the catalyst material. The reaction tube was heated by means of an oil bath. The effluent from the reaction tube was passed through a water cooled condenser and the condensed product was collected for analysis.

EXAMPLE 1

2-nitropropane was vaporized and passed during a 90-minute period through a reactor tube containing as catalyst 15 grams of platinum supported on alumina. The temperature of the reaction during the 90-minute period ranged from 280 to 290° C. Atmospheric pressure was maintained during the reaction period. A flow rate of 22.0 was employed. Acetonitrile was obtained in a yield of 41.5% based on the 2-nitropropane.

EXAMPLE 2

1-nitropropane was vaporized and passed during a 3-hour period through a reactor tube containing as catalyst 15 g. of platinum supported on alumina. The temperature of the reaction during the 3-hour period ranged from 270 to 280° C. Atmospheric pressure was maintained during the reaction. A flow rate of 28.0 was employed. Propionitrile was obtained in a yield of 32% based on the 1-nitropropane. Acetonitrile was obtained in a yield of 6% based on the 1-nitropropane.

EXAMPLE 3

The process of Example 2 is repeated in all essential details with the exception of 1-nitropentane is substituted for 1-nitropropane. Valeronitrile is obtained.

EXAMPLE 4

The procedure of Example 2 is followed in all essential details with the exception that 1-nitrohexane is substituted for 1-nitropropane and platinum gauze is used as the catalyst. Capronitrile is obtained.

EXAMPLE 5

The procedure of Example 2 is followed in all essential details with the exception that 2-nitrohexane is substituted for 1-nitropropane. Acetonitrile and butyronitrile are obtained.

EXAMPLE 6

The procedure of Example 2 is followed in all essential details with the exception that the compound 1-nitropropane is mixed with steam. Acetonitrile is obtained.

Since many embodiments may be made in this invention and since many changes may be made in the embodiments described, the foregoing is to be interpreted as illustrative only and the invention is defined by the claims appended hereto.

I claim:

1. A process for the production of alkyl mononitriles under vapor phase reaction conditions consisting essentially of passing a gaseous stream of a primary nitroalkyl or a secondary nitroalkyl reactant into contact with platinum at temperatures not in excess of those at which substantial decomposition of the alkyl nitrile occurs.

2. The process of claim 1 wherein the reactant is of the formula

wherein R is a lower alkyl radical and wherein $R^1$ is hydrogen or a lower alkyl radical.

3. The process of claim 2 wherein the temperature is not in excess of 800° C.

4. The process of claim 2 wherein the pressure is within the range from about 10 to about 1000 pounds per square inch absolute.

5. The process of claim 2 wherein the flow rate is within the range from about 0.1 to about 100.

6. The process of claim 3 wherein the nitrohydrocarbon is 1-nitropropane.

7. The process of claim 3 wherein the nitrohydrocarbon is 2-nitropropane.

References Cited

Stamicarbon N.V., C.A. 49 (1955), p. 14802, QD–1–A51.

JOSEPH P. BRUST, *Primary Examiner.*